United States Patent
Nichols

(10) Patent No.: US 6,353,775 B1
(45) Date of Patent: Mar. 5, 2002

(54) MULTIPLE INSTANCE SINGLE VALUE IDENTIFIERS ENVIRONMENTAL CONTROL COMMUNICATION METHOD AND SYSTEM

(75) Inventor: Steven C. Nichols, Maple Grove, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/123,651

(22) Filed: Jul. 28, 1998

(51) Int. Cl.[7] .............................................. G05B 15/00
(52) U.S. Cl. ......................................... 700/276; 710/11
(58) Field of Search ................................ 700/276, 277, 700/278; 710/9, 10, 11, 12, 13

(56) References Cited

U.S. PATENT DOCUMENTS

| | | | |
|---|---|---|---|
| 4,633,309 A | * 12/1986 | Li et al. ..................... | 358/122 |
| 5,001,554 A | * 3/1991 | Johnson et al. ................ | 358/86 |
| 5,479,508 A | * 12/1995 | Bestler et al. ................. | 380/20 |
| 5,502,818 A | 3/1996 | Lamberg | |
| 5,510,775 A | 4/1996 | Loncle | |
| 5,528,757 A | * 6/1996 | Yamaski ..................... | 709/200 |
| 5,551,053 A | 8/1996 | Nadolski et al. | |
| 5,634,009 A | * 5/1997 | Iddon et al. ................. | 709/200 |
| 5,675,830 A | 10/1997 | Satula | |
| 5,854,454 A | * 12/1998 | Upender et al. ............. | 187/247 |
| 5,916,306 A | * 6/1999 | Ruiz ........................... | 709/242 |
| 5,958,029 A | * 9/1999 | Mckinnon .................... | 710/100 |
| 5,987,533 A | * 11/1999 | Hong ............................ | 710/9 |

* cited by examiner

Primary Examiner—Thomas Lee
Assistant Examiner—Rijue Mai

(57) ABSTRACT

A method of communicating between a plurality of devices in a controller area network is disclosed. The method includes authorizing a first device to transmit messages with a first identifier over the network, the first device transmitting a first message with the first identifier and a first value, and the devices which receive the first message assuming the first value as their respective values. The method may be used with a number of devices and a listening device in a system. At startup of the system, any device which saved its value in a non-volatile memory will become the master of the identifier and transmit a message with the value over the network. Devices which did not save their values in non-volatile memories will transmit requests for the data value. If they do not receive any response, they will become the master and transmit messages with their data. Devices which receive the message will assume the value as theirs. If the value at a device is changed, that device will become master and transmit a message with its value.

19 Claims, 2 Drawing Sheets

MULTIPLE INSTANCE SINGLE VALUE IDENTIFIERS ENVIRONMENTAL CONTROL COMMUNICATION METHOD AND SYSTEM

FIELD OF THE INVENTION

This invention relates to methods for communicating in a control area network, and particularly to such methods in which a listening device in the network listens to a number of devices transmitting data with a common instance.

BACKGROUND OF THE INVENTION

In controlling various kinds of equipment in homes and buildings, the equipment is often connected to a network through which information is transmitted. Connecting the equipment together in a network system has the advantage that various parts of the system can "communicate" with each other, whereby the system works with maximum efficiency and potential inconsistencies, such as two parts of the system counteracting each other in operation, can be avoided.

A controller area network may, for example, be used for such purposes. Messages of variable length are transmitted in the network for controlling the system to operate according to provided algorithms. The message frame format includes an identifier at the beginning of each message which provides an identity for each message. The identity may, for example, relate to the kind of data transmitted in a data field of the message.

In a system including several similar devices owning the same identifier, and including at least one listening device which receives the information transmitted by the devices, the system should facilitate that the listening device knows to which devices to listen. It is also important that the network is not overloaded with messages from those devices to which the listening device is not listening. It may be desirable to have several devices connected in a network such that one or more operational modes may be set at any of the devices, whereby the other devices assume the operational mode setting conformly.

One way of arranging a system in accordance with the above would be to configure the information type transmitted by the devices, such that they are all different. This allows every device to transmit its messages regardless of the other devices, since the listening device would be able to distinguish between messages—and accordingly between data values in the various messages—from the different devices. However, this method is undesirable in that it requires more initial programming and system configuration than is desirable for the typical home and building control system. Besides the additional work requirement, which may be inconvenient in a home or other building environment, the costs of installation will likely increase with such a solution.

Furthermore, the amount of information transmitted in the network may typically increase with such a method, perhaps causing undesirable jams in data transfer and/or making the system harder to manage. An additional disadvantage is that devices cannot be added, and/or removed from the system without particular reconfiguration and/or readdressing of the existing devices.

SUMMARY OF THE INVENTION

A method of communicating between a plurality of devices in an environmental control network includes authorizing a first device to transmit messages with a first identifier over the network, transmitting a first message with the first identifier and a first value from the first device for receipt by at least one second device. The second device, which receives the first message, assumes the first value as its value, and the first and second devices monitor their respective values for changes and transmit their respective values if there are changes. The first device is deauthorized from transmitting messages with the first identifier if it receives a message with the first identifier.

An embodiment of the method according to the invention involves a number of devices and a listening device in a system. At startup of the system, any device which saved its value in a non-volatile memory and has not yet received a value from another device, will become the master of the identifier and transmit a message with the value over the network. Devices which did not save their values in non-volatile memories will transmit requests for the data value. If they do not receive any response, they will become the master and transmit messages with their data. Devices which receive the message will assume the value as theirs. If the value of any device is changed, that device will become master and transmit its changed value over the network.

These and various advantages and features of novelty which characterize the invention are pointed out with particularity in the claims annexed hereto and forming a part hereof. However, for a better understanding of the invention, its advantages, and the objects obtained by its use, reference should be used to the accompanying drawings and descriptive matter which form a further part hereof, and in which there is illustrated and described preferred embodiments of the invention.

DETAILED DESCRIPTION OF THE PREFERRED EMBODIMENT

The low end subsystem topology (LESST), developed by Honeywell Inc., is a topology used for a low cost communication system of microprocessor based HVAC controls for residential applications. Many different kinds of systems may operate under the LESST topology. Several types of nodes, including thermostats, actuators, and sensors may be physically linked together using, for example, a three wire connection scheme.

As is well known, the ISO/OSI standard defines seven communication layers—the application, presentation, session, transport, network, link and physical layers. LESST uses three of the seven OSI communication layers—the application, data link and physical layers. The application layer of LESST includes rules for broadcasting data messages between nodes in a LESST system.

Messages in the LESST system include a name of the message, an instance of the data, and the value of the data. The instance field may, for example, be used to distinguish a message from another message having the same name and the same or different data value. An ultimate consumer of data in LESST system network may listen for a special instance of data, for example instance zero.

When a number of devices which own the same identifier are connected in a system, it may be provided that they should have the same data value for that identifier. For example, if several thermostats are connected in a network it may be provided that a setting made on one thermostat should be assumed by the other thermostats as their setting as well. The character of the setting may vary depending on the circumstances of the application in which the system is used. For example, a system switch in an LESST system may be capable of having settings such as "heat", "cool", "off", "auto changeover" and "emergency heat". As another example, a fan switch in an LESST system may be capable of having settings such as "fan on" and "fan auto".

In an LESST system where a plurality of devices may transmit messages with a particular instance, a function may be provided to authorize one of the devices to transmit its message. The device which is authorized to transmit its message including its data over the network is said to be the master. Only the master may transmit messages with the particular identifier.

Figure 1:
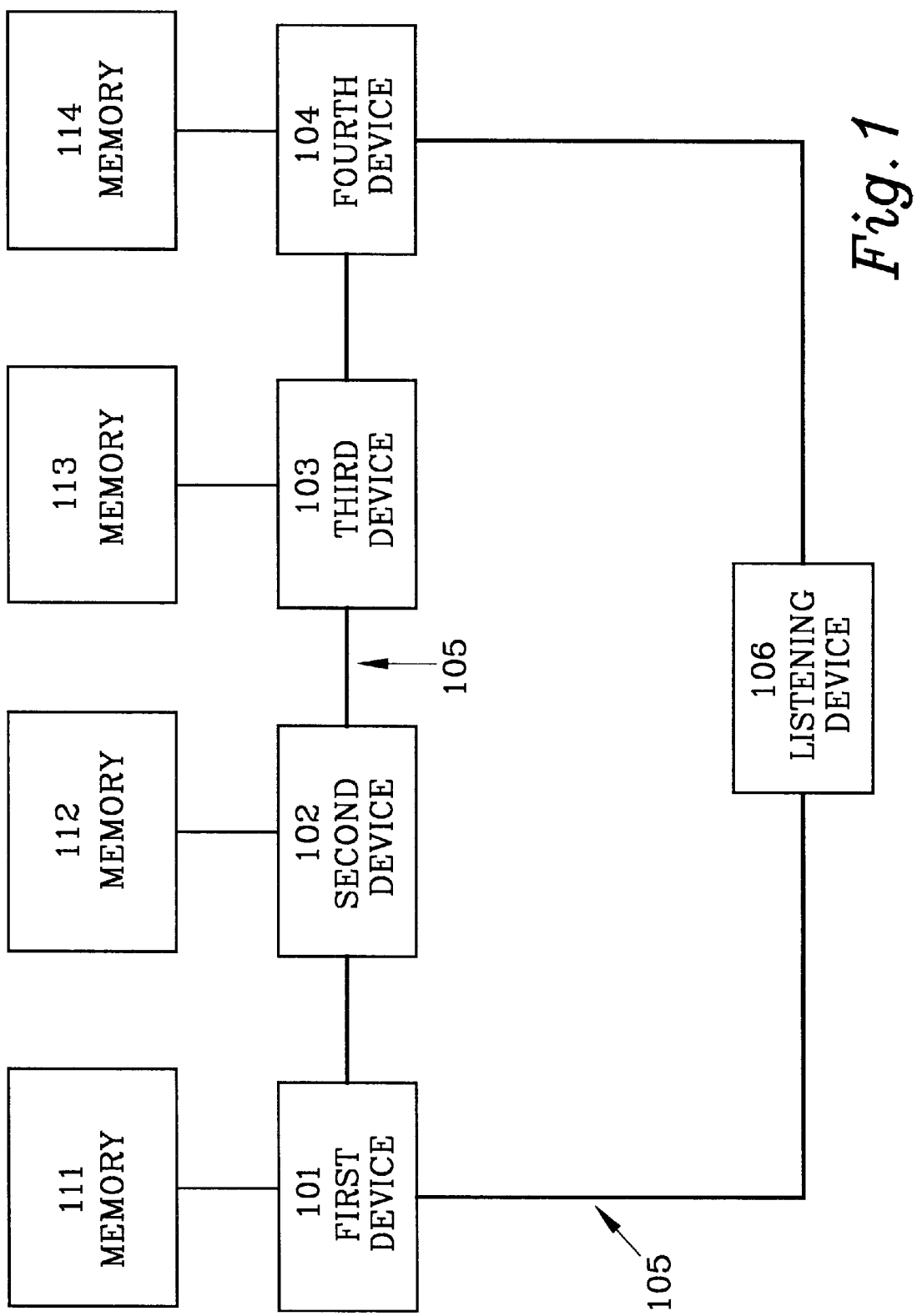
FIG. 1 is an exemplary network in which embodiments of the method according to the invention may be used.

An exemplary network system in which an embodiment of the method according to the invention may be used is shown in FIG. 1. Four devices 101–104 are connected to a listening device 106 through the bus 105. The devices 101–104 are capable of transmitting messages over the bus 105 to communicate with each other and with the listening device 106.

Several different devices may be used as the devices 101–104. They may all be equivalent devices, or they may include different devices. For example, one or more of the devices 101–104 may be a thermostat, a fan switch or a system switch. Several different devices may be used as the listening device 106 in embodiments of the invention. The listening device 106 listens to the messages having the identifier owned by the devices 101–104. For example, the listening device 106 may be a furnace which controls its operation using the value kept by the devices and transmitted by the one that is the master. For example, if the first device 101 is a thermostat and is presently the master, the furnace may receive a value from the master indicating a demand for more heating. It should be noted that fewer or more devices than shown in FIG. 1 may be used with embodiments of the invention, and similarly, more or fewer listening devices may be used.

In FIG. 1, the devices 101–104 are connected to memories 111–114. The memories 111–114 may for example be used to store values used by the devices 101–104 during operation and/or while the system is shut down. One or more of the memories 111–114 may be a non-volatile memory, in order for it to serve its purposes in the network. For example, when the system is initiated after being shut down, devices which have stored their values in non-volatile memory may retrieve their values upon initiation. It is noted that in other embodiments of the invention, all devices need not be connected to a memory as shown in FIG. 1.

The devices 101–104 own the same identifier in this embodiment of the method. The listening device 106 listens to messages sent with the particular instance. At start up of the system, each one of the devices that stored their values in a non-volatile memory and which has not yet received a value from another device, will become the master and transmit messages with their values over the bus 105. Since only one device accesses the bus 105 at a time, the transmission occurs serially, therefore the first device that accesses the bus 105 will be the master. Devices which did not save their values in a non-volatile memory and which have not yet received a value from other devices, will transmit requests for the data value. If they do not receive any response, they will become the master and transmit messages with their data.

In practical situations, any one of the four devices may be the first to access the bus 105, but for purposes of clarity it will be assumed in this description that the first device 101 is the first one to transmit its message. The other devices 102–104 receive the message and assume its data value as their respective values.

The listening device 106 responds to the last message received. As noted above, the listening device 106 may, for example, be a furnace in a building.

The device 101, which is the master, will periodically send a message over the network including its current data value. If the value is changed since the last transmission, the device 101 may transmit the new value as soon as the change takes place. As long as no one of the other devices receive a change of value which makes them the master, they will not transmit their values. The period between regularly transmitted messages may be selected in consideration of the particular application in which the method is being used. For example, a period of about 20–40 minutes may be used in some applications.

If one of the devices 102–104, which are not the master, has not received any message for a period of time, it will become the master and transmit a message with its data value over the network. The period of time before this is done may be selected in consideration of the particular application in which the method is being used, and/or in consideration of the periodicity of regularly transmitted messages as described just above.

Similarly, if one of the devices 102–104, which is not the master, detects a condition where a message should have been received but it wasn't, the device will become the master and transmit its message over the network. For example, if a device detects that a query was sent from another device, and there was no message in response to the query, it will become the master and transmit its message.

In using embodiments of the method according to the invention, devices may be connected in a LESST network without particular addressing or configuration of each device. The devices in the network which own the same identifier are forced to have the same data value for that identifier, and only the device which is the master may transmit messages with the identifier.

Figure 2:
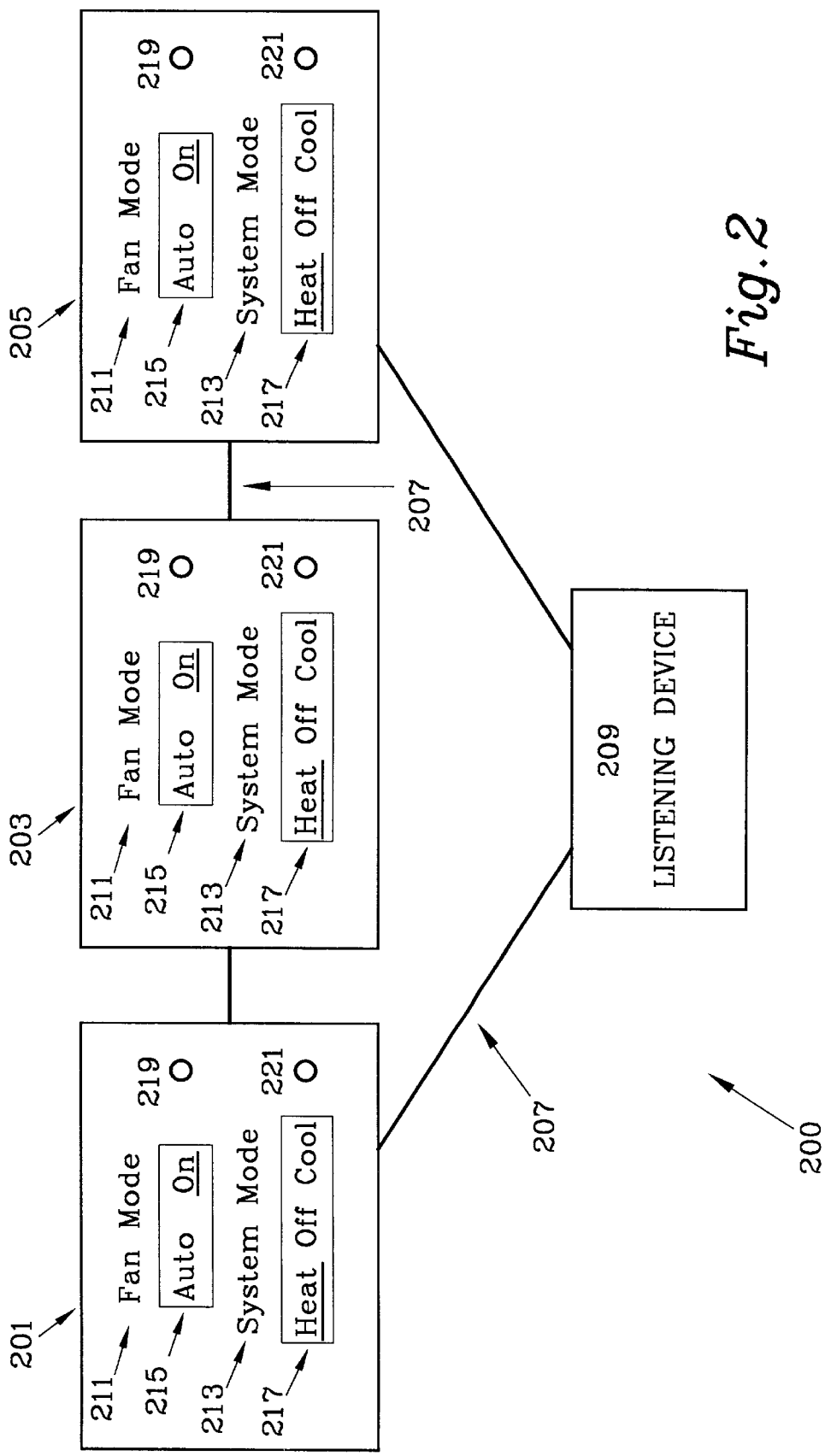
FIG. 2 is another exemplary network in which embodiments of the method may be used.

FIG. 2 shows another exemplary network including devices 201, 203, and 205 in an environmental control system 200. The devices 201, 203 and 205 may, for example, be thermostats in a building. Each device includes mode identifiers 211 and 213. As shown in the drawing, the mode identifiers may for example be "fan mode" and "system mode". Each device also has displays 215 and 217. The display 215 is used to display a status value of the mode identifier 211. In the illustrated network, the mode identifier 211 has two status values, "auto" and "on", where "on" is the currently set status value for the fan mode identifier. The status value 215 may be changed by a user interface 219, which for example may be a push button which toggles the status value each time it is pressed.

In the display 217 the mode identifier 213 has three status values, "heat", "off" and "cool". In the shown situation, the status value "heat" is the one activated. The status value 217 may be changed by the user interface 221, which for example may be a push button substantially as described above.

The devices 201, 203 and 205 may transmit messages including the mode identifiers 211 and 213, and further including a status value of the mode identifier. For example, a message from device 205 may include the mode identifier "System mode" and the status value "heat".

The devices 201, 203 and 205 are connected by a serial bus 207. Many different well know serial buses may be used with embodiments of the invention. A listening device 209 is connected to the bus 207. The listening device 209 "listens" to the current status values of the mode identifiers 211 and 213. The listening device 209, may, for example, use the status values to control its own operation or forward the status values to other devices which use them to control their operation. It is noted that fewer or more devices than shown in FIG. 2 may be used with embodiments of the invention, and similarly, more or fewer listening devices may be used.

An exemplary use of the network 200 will now be described. At initialization of the system 200, each one of the devices 201, 203 and 205 which have saved their status value 215 and 217 in non-volatile memory will become the master and transmit a message with their respective status value. In this exemplary description, it will be assumed that only the device 201 saved its status value in non-volatile memory. Many different well known non-volatile memories may be used with embodiments of the network. In this example the device 201 transmits the status value 215, which is "on", and its status value 217, which is currently "heat" over the network 200.

The devices 203 and 205, which did not store their values, will transmit requests for the status values 215 and 217 over the network. The devices 203 and 205 will receive the message from the device 201 and assume the status values 215 and 217 as their respective values.

The device 201 which became the master at initialization of the network 200, will periodically transmit a message with its status values 215 and 217. In the meantime, all three devices are monitoring their respective status values for changes. For example, the status value 215 of the device 203 may be changed through the user interface 219. If a user changes the status value in device 203, that device will become the master and transmit a message with its new status value over the network 200. As an example, if a user changed the status value 215 to "auto" in device 203, a message indicating the new status value would be transmitted to the other devices 201 and 205 from device 203 which would presently be the master.

It is to be understood, that even though numerous characteristics and advantages of the invention have been set forth in the foregoing description, together with details of the structure and function of the invention, the disclosure is illustrative only, and changes may be made in detail, especially in matters of shape, size and arrangement of the parts within the principals of the invention to the full extent indicated by the broad general meaning of the terms in which the appended claims are expressed.

I claim:

1. A method of communicating between a plurality of devices in an environmental control network, the method comprising:
   authorizing a first device to transmit messages with a first identifier over the network;
   transmitting a first message with the first identifier and a first value from the first device on the network for receipt by at least one second device;
   the second device which receives the first message assuming the first value as its respective value;
   the first and second devices monitoring their respective values for changes and transmitting their respective values if there are changes to their respective values; and
   deauthorizing the first device from transmitting messages with the first identifier if the first device receives a message with the first identifier.

2. The method of claim 1, wherein the step of authorizing the first device to transmit messages is carried out after the first device has not received any message within a time period.

3. The method of claim 1, wherein the step of authorizing the first device to transmit messages is carried out after the first device has not received an answer to a request with the first identifier which was transmitted over the network.

4. The method of claim 1, wherein the second device is already authorized to transmit messages with the first identifier when it receives the first message, further comprising the step of deauthorizing the second device from transmitting messages with the first identifier after it receives the first message.

5. The method of claim 1, further comprising the step of the first device storing the first value in a non-volatile memory prior to the step of authorizing the first device to transmit messages with the first identifier.

6. The method of claim 1, wherein the second device had not stored a value with the first identifier in a non-volatile memory, further comprising the step of the second device transmitting a request with the first identifier over the network.

7. The method of claim 1, wherein the first value is selected from the group consisting of the commands heat, cool, and off.

8. The method of claim 1, wherein the first value is selected from the group consisting of the commands fan on and fan auto.

9. The method of claim 1, further comprising the step of a third device, which is not authorized to transmit messages, receiving a user-input change in its value and thereby authorizing itself to transmit messages, and transmitting a message.

10. The method of claim 1, further comprising the step of a third device, which is not authorized to transmit messages, detecting a condition that a message should have been received but it was not, whereby the third device authorizes itself to transmit messages, and transmits a message.

11. The method of claim 1, further including the step of a third device transmitting a message to the first device with instructions for the first device to change its value.

12. An environmental control network with a network bus, the network comprising:
   a plurality of devices connected to the network bus, each device including:
      means for transmitting messages over the network including a first identifier and a value;
      means for monitoring the network bus for any messages transmitted on the network bus;
      means for terminating transmission of further messages if the device receives a message with the first identifier;
      means for storing the value at the device;
      means for changing the value at the device; and
      means for actuating the means for transmitting to transmit the value as changed.

13. The system of claim 12, wherein at least one of the devices further includes means for transmitting a message if the device has not received a message during a time period.

14. The system of claim 12, wherein at least one device further includes a memory for storing the value.

15. The system of claim 14, wherein at least one device other than the device including the memory further includes means for transmitting a request over the network.

16. The system of claim 12, wherein at least one device further includes means for transmitting a message if the device detects a condition that an expected message was not received.

17. The system of claim 12, further including means for changing the value in response to a message from another device.

18. An environmental control system, comprising:

a plurality of devices;

a serial network bus interconnecting the devices; and each of the devices having at least one mode and including:
- means for storing in memory a mode identifier and a status value of the mode;
- means for displaying the status value of the mode stored in memory;
- means for transmitting a message including the mode identifier and the status value so stored in memory;

means for monitoring messages transmitted on the bus:
- means for terminating transmission of messages upon detection of a message with a mode identifier the same as the stored mode identifier and means for storing a status value contained in the message so as the status value of the mode stored in memory, whereby all devices display the status value of the last device to transmit on the network;
- user interface means for changing the status value of the mode stored in memory; and
- means for detecting a change of the status value of the mode stored in memory and initiating transmission of a message including the status value as changed.

19. A method of communicating between a plurality of devices in an environmental control network, the method comprising:

authorizing a first environmental control device to transmit messages with a first identifier over the network;

transmitting a first message with the first identifier and a first value from the first device on the network for receipt by at least one second environmental control device;

the second environmental control device which receives the first message assuming the first value as its respective value;

the first and second environmental control devices monitoring their respective values for changes and transmitting their respective values if there are changes to their respective values; and deauthorizing the first environmental control device from transmitting messages with the first identifier if the first environmental control device receives a message with the first identifier.

* * * * *